Figure 1:
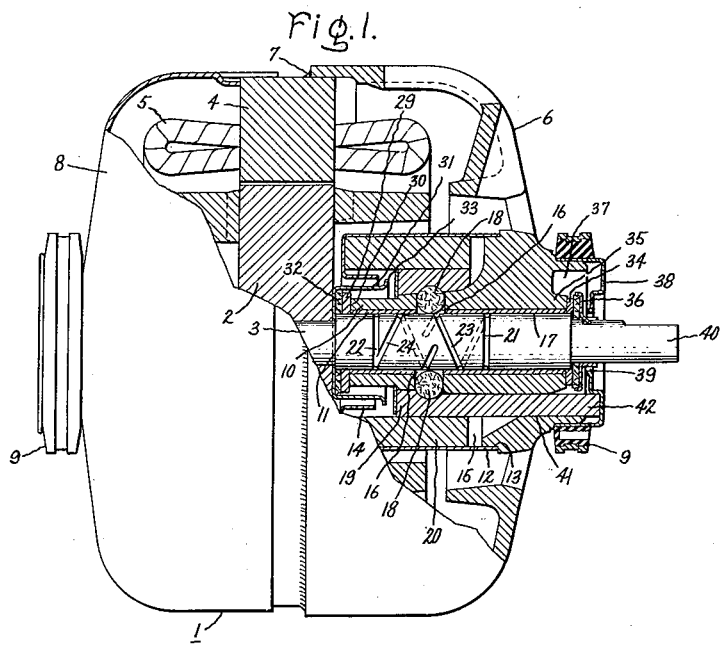

Inventor:
Lawrance W. Wightman,
by Prowell S. Mack
His Attorney.

Patented June 26, 1951

2,558,598

UNITED STATES PATENT OFFICE 2,558,598

BEARING CONSTRUCTION

Lawrence W. Wightman, Fort Wayne, Ind., assignor to General Electric Company, a corporation of New York Application April 19, 1949, Serial No. 88,369

7 Claims. (Cl. 308—132)

This invention relates to bearing constructions and more particularly to unit bearing constructions which may be operated in any position.

In the design of certain rotating equipment, particularly motors of the fractional horsepower frame sizes, it is frequently desirable to provide a unit bearing construction wherein the rotating element is supported by a single bearing. It may also be desirable to design the machine for operation in any position, i. e. with the shaft horizontal or vertical up or down. The design of a unit bearing to meet these requirements involves problems which are not encountered in bearing design for a machine having two or more bearings. The problem is initially complicated by virtue of the fact that the end load of a unit bearing with only the rotor weight on the shaft is fairly high since the journal surface is cocked as well as deflected within the bearing so that all of the load is carried at the bottom of the bearing end toward the load and the top of the other bearing end remote from the load. The placing of a load on the shaft extension produces even further shaft deflection with a further increase in bearing pressure. These factors render the provision of adequate lubrication for the bearing particularly important. In the past, unit bearings have been lubricated by introducing oil at one end of the bearing and causing it to be pumped completely through the bearing by pumping grooves formed on the journal surface of the shaft. However, with this type of construction the wicking distance is necessarily long and only one end of the bearing can be used for a thrust bearing. It would thus appear to be desirable to introduce lubricant to the journal surface at a point midway between the ends of the bearing to secure a short wicking distance and to enable both ends of the bearing to be used as thrust bearings. However, with this construction, it is necessary that the lubricant be made to flow from the center toward both ends of the bearing. It has been found that when lubricant is introduced midway between the ends of the bearing, there is a tendency for the lubricant flow to be toward either one end or the other end of the bearing rather than in both directions at once. By the provision of various arrangements of pumping grooves, it has been found possible to improve the flow of lubricant toward both ends of the bearing, however, it was found that regardless of the grooving arrangement used, the direction of lubricant flow was substantially dependent upon the direction of the load upon the shaft. Further investigation has revealed that the lubricant simply follows the path of least resistance after it leaves the wick and does not travel through the pumping grooves, but rather travels axially through the shortest and most open space between the journal surface and the bearing. The improved bearing construction of this invention, therefore, provides for the introduction of lubricant to the journal surface at two diametrically opposite points intermediate the ends of the bearing. Thus, regardless of the direction of load, lubricant is pumped in one direction from one point of introduction and in the other direction from the other point of introduction. A change in the direction of load such that the direction of lubricant flow from one point of introduction is reversed also reverses the direction of lubricant flow from the other point of introduction. Thus, lubricant will always flow through the bearing in both directions regardless of the direction of the applied load. This construction, therefore, enables the machine to be operated in any position and with an applied load on the shaft extension in any direction.

An object of this invention is to provide an improved bearing construction.

Another object of this invention is to provide an improved bearing construction wherein lubricant is pumped through the bearing in both directions regardless of the direction of the applied load.

A further object of this invention is to provide an improved bearing construction which permits operation of the shaft in any position.

A still further object of this invention is to provide an improved unit bearing construction wherein the lubricant is introduced to the journal surface of the shaft intermediate the ends of the bearing.

Yet another object of this invention is to provide an improved unit bearing construction wherein both ends of the bearing may be utilized as thrust bearings.

Further objects and advantages of this invention will become apparent and the invention will be better understood from the following description referring to the accompanying drawings, and the features of novelty which characterize the invention will be pointed out with particularity in the claims annexed to and forming part of this specification.

In accordance with this invention, there is provided a sleeve bearing having two openings therethrough at diametrically opposite points intermediate the ends of the bearing communicating with the journal surface of the shaft. Two lubricant feeding wicks are positioned in these openings for feeding lubricant to the journal surface at two diametrically opposite points. Lubricant absorbent material is arranged surrounding the bearing for retaining lubricant and for feeding the same to the wicks. The journal surface of the shaft is provided with two peripheral grooves respectively spaced from the point of lubricant introduction and two opposed spiral grooves, one groove having one extremity extending across the center line of the wicks and its other end communicating with one peripheral groove and the other groove having one extremity also extending across the center line of the wicks and its other end communicating with the other peripheral groove. The two spiral grooves are respectively arranged so that the center extremity of one groove is on one side of the shaft and the center extremity of the other groove is on the other side of the shaft so that they both ride under the two wicks, one extremity being under one wick when the other extremity is under the other wick. Thus, lubricant introduced respectively to the two diametrically opposite points on the journal shaft is pumped toward both ends of the bearing by the two spiral grooves regardless of the direction of shaft load.

Figure 2:
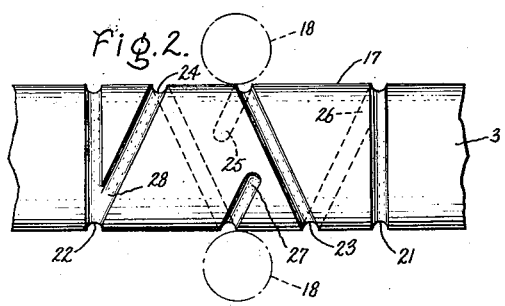
Figure 3:
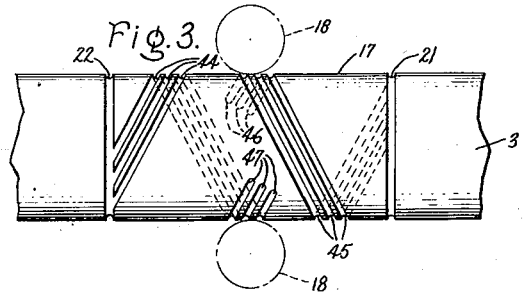

In the drawing, Fig. 1 is a side elevational view partly in section illustrating the improved bearing construction of this invention; Fig. 2 is a fragmentary detailed view of the shaft grooving of the construction of Fig. 1, and Fig. 3 is a detailed fragmentary groove of a multiple shaft grooving arrangement.

Referring now to Fig. 1, there is shown a dynamo-electric machine generally identified as 1, having a rotor member 2 mounted on a shaft 3 and a stator member 4 provided with appropriate windings 5. An end shield member 6 is secured to the stator member 4 in any suitable manner, as by welding at 7, and a cap member 8 is fitted over the stator member 4 to enclose the other end of the machine. Resilient mounting rings 9 are respectively secured to the end shield 6 and the cover 8 and serve to resiliently support the machine in a conventional mounting bracket (not shown). The end shield 6 is provided with a re-entrant bearing post or support 10 formed integral therewith which carries a bearing sleeve 11 for rotatably supporting the shaft 3. A bearing housing member 12 is secured to a recess 13 in the end shield 6 and surrounds the bearing support and sleeve assembly 10 and 11. The bearing housing member 12 is provided with a re-entrant flange portion 14 thus forming a lubricant reservoir portion 15. Two openings 16 are formed through the bearing support 10 and bearing sleeve 11 communicating with the journal surface 17 of the shaft 3 at two diametrically opposite points intermediate the two ends of the bearing. Two wicks 18 formed of lubricant absorbent material, such as felt, are positioned in the openings 16 for feeding lubricant to the journal surface 17 of the shaft 3. A ring of lubricant absorbent material 19 is positioned in the lubricant reservoir 15 and another ring of lubricant absorbent material 20 surrounds the bearing support 10 within the lubricant absorbent ring 19. The lubricant absorbent rings 19 and 20 serve to retain lubricant and to feed the same to the wicks 18.

The journal surface 17 of the shaft 3 is provided with two peripheral grooves 21 and 22 formed thereon respectively spaced from the openings 16 toward the ends of the bearing and two opposed spiral grooves 23 and 24. As will be seen more clearly in Fig. 2, groove 23 has one extremity 25 extending across the center line of the wicks 18 and its other extremity 26 communicating with the peripheral groove 21. The other groove 24 has one extremity 27 also extending across the center line of the wicks 18 and its other extremity 28 communicating with the other peripheral groove 22. The two spiral grooves 23 and 24 are arranged so that the center extremity 25 of the groove 23 is on one side of the shaft and the extremity 27 of the groove 24 is on the other side of the shaft so that both the center extremities ride under the wicks 18 and the extremity 27 will be under one wick when the extremity 25 is under the other wick.

A thrust journal washer 29 is secured to the shaft 3 adjacent the inner end 30 of the bearing support and sleeve assembly 10 and 11 and a cup shaped lubricant throwing member 31 is secured to the shaft 3 abutting the rotor 2 and is supported by a resilient washer 32. The cup shaped lubricant thrower 31 is arranged within a re-entrant flange portion 14 of the bearing housing member 12 and is provided with a flange portion 33 extending toward the lubricant reservoir 15. Another thrust journal washer 34 is secured to the shaft 3 adjacent the outer end 35 of the bearing support and bearing sleeve assembly 10 and 11. A lubricant thrower 36 is also secured to the shaft 3 adjacent the lubricating washer 34 in the end cavity 37 of the end shield 6. A cap member 38 having an opening 39 for receiving the shaft extension 40 of the shaft 3 closes the end cavity 37.

It will now be readily seen that lubricant introduced to the journal surface 17 of the shaft 3 by the two wicks 18 will be pumped toward both ends of the bearing simultaneously by the spiral pumping grooves 23 and 24. In this connection, it has been found that the lubricant is not pumped along the grooves but flows, as mentioned above, along the path of least resistance from the wick to the end of the bearing. The grooves, however, increase the axial pumping of the lubricant and assist its flow through the bearing. Lubricant which is pumped by the groove 24 toward the end 30 of the bearing is picked up by the lubricant thrower 31 and thrown centrifugally into the lubricant retaining ring 19. Lubricant which is pumped by the groove 23 toward the end 35 of the bearing is picked up by the lubricant thrower 36 and thrown into the end cavity 37. A lubricant return opening 41 is formed in the bearing support 10 communicating with the end cavity 37 and the lubricant reservoir 15 providing for the return of lubricant from the end cavity into the lubricant reservoir and the lubricant retaining ring 19. The lubricant retaining ring 19 is provided with a projection 42 extending through the lubricant return opening 41 into the end cavity 37. Thus, in the event the motor is operated with the shaft extension 40 down, lubricant which is thrown by the lubricant thrower 36 collects in the reservoir portion 43 formed by the cap member 38 and is returned to the main lubricant reservoir 15 by the projection 42.

It will now be readily apparent that with this construction lubricant will be pumped toward both ends of the bearing in any shaft position regardless of the direction of applied load on the shaft extension 40. While the arrangement of grooves of Fig. 2 is highly effective for pumping lubricant through the bearing for one direction of shaft rotation, the improved double opposed wicking arrangement of this bearing will provide lubricant flow toward both ends of the bearing regardless of the direction of rotation if the journal surface of the shaft is ungrooved. However, it is usually necessary to provide grooving to secure adequate lubrication and if it is necessary to provide the motor for operation in either direction of rotation, two opposed sets of grooves of the type shown in the applicant's application Serial No. 68,995, filed January 3, 1949, assigned to the assignee of the present application, may be utilized.

Referring now to Fig. 3, there is shown a modified grooving arrangement wherein the journal surface 17 of the shaft 3 is provided with a plurality of closely spaced spiral grooves 44 and another plurality of closely spaced spiral grooves 45 opposed to the grooves 44. The grooves 44 and 45 respectively communicate with the peripheral grooves 21 and 22 and their extremities 46 and 47 respectively extend across the center line of the wicks 18, the center extremities 46 being on one side of the shaft and the center extremities 47 being on the other side, in the manner of the grooves 23 and 24 of Figs. 1 and 2. This grooving arrangement has been found to provide an improved pumping action over the grooving arrangement of Figs. 1 and 2.

While I have illustrated and described a particular embodiment of this invention, modifications thereof will occur to those skilled in the art. I desire it to be understood, therefore, that this invention is not to be limited to the particular arrangement disclosed, and I intend in the appended claims to cover all modifications which do not depart from the spirit and scope of this invention.

What I claim as new and desire to secure by Letters Patent of the United States is:

1. A bearing construction comprising a sleeve bearing for rotatably supporting a shaft, two lubricant feeding openings in said bearing at diametrically opposite points for communicating with the journal surface of said shaft, lubricant absorbent material in said openings for feeding lubricant to two diametrically opposite points of said journal surface, said journal surface having a lubricant pumping groove formed thereon extending toward one end of said bearing, said journal surface having another lubricant pumping groove formed thereon opposed to said first-mentioned groove extending toward the other end of said bearing, said grooves and said two points for feeding lubricant to the journal surface causing said lubricant to flow toward both ends of said bearing regardless of the direction of load on said shaft.

2. A bearing construction comprising a sleeve bearing for rotatably supporting a shaft, two lubricant feeding openings in said bearing at diametrically opposite points for communicating with the journal surface of said shaft, lubricant absorbent material positioned in said openings for feeding lubricant to two diametrically opposite points of said journal surface, said journal surface having a spiral lubricant pumping groove formed thereon having one extremity disposed across the plane of said openings, said groove extending toward one end of said bearing, said journal surface having another spiral lubricant pumping groove formed thereon opposed to said first-mentioned groove and having one extremity disposed across the plane of said openings, said second groove extending toward the other end of said bearing, said grooves and said two points for feeding lubricant to the journal surface causing said lubricant to flow toward both ends of said bearing regardless of the direction of load on said shaft.

3. A bearing construction comprising a bearing housing member, a sleeve bearing positioned in said housing for rotatably supporting a shaft, two lubricant feeding openings in said bearing at diametrically opposite points for communicating with the journal surface of said shaft, wicks formed of lubricant absorbent material positioned in said openings for feeding lubricant to two diametrically opposite points on said journal surface, and lubricant absorbent material positioned in said housing surrounding said bearing for retaining lubricant and for feeding the same to said wicks, said journal surface having a spiral groove formed thereon having one extremity disposed across the plane of said openings, said groove extending toward one end of said bearing, said journal surface having another spiral lubricant pumping groove formed thereon opposed to said first-mentioned groove and having one extremity disposed across the plane of said openings, said second groove extending toward the other end of said bearing, said grooves and said two points for feeding lubricant to the journal surface causing said lubricant to flow toward both ends of said bearing regardless of the direction of load on said shaft.

4. A bearing construction comprising a bearing housing member, a sleeve bearing positioned in said housing for rotatably supporting a shaft, two lubricant feeding openings in said bearing at diametrically opposite points for communicating with the journal surface of said shaft, wicks formed of lubricant absorbent material positioned in said openings for feeding lubricant to two diametrically opposite points on said journal surface, and lubricant absorbent material positioned in said housing surrounding said bearing for retaining lubricant and for feeding the same to said wicks, said journal surface having two peripheral grooves formed thereon respectively positioned at either end of said bearing, said journal surface having a spiral groove formed thereon with one extremity extending across the plane of said openings and the other end communicating with one of said peripheral grooves, said journal surface having another spiral lubricant pumping groove formed thereon opposed to said first-mentioned groove with one extremity extending across the plane of said openings and the other end communicating with the other of said spiral grooves, said grooves and said two points for feeding lubricant to said journal surface causing said lubricant to flow toward both ends of said bearing regardless of the direction of load on said shaft.

5. A bearing construction comprising a bearing housing member, a sleeve bearing positioned in said housing for rotatably supporting a shaft, two lubricant feeding openings in said bearing at diametrically opposite points for communicating with the journal surface of said shaft, wicks formed of lubricant absorbent material positioned in said openings for feeding lubricant to two diametrically opposite points on said journal surface, and lubricant absorbent material positioned in said housing surrounding said bearing for retaining lubricant and for feeding the same to said wicks, said journal surface having a plurality of closely spaced spiral lubricant pumping grooves formed thereon with one extremity of each groove extending across the plane of said openings, said grooves extending toward one end of said bearing, said journal surface having another plurality of closely spaced spiral lubricant pumping grooves opposed to said first-mentioned grooves with one extremity of each groove extending across the plane of said openings, said other grooves extending toward the other end of said bearing, said grooves and said two points for feeding lubricant to the journal surface causing said lubricant to flow toward both ends of said bearing regardless of the direction of load on said shaft.

6. A bearing construction comprising a bearing housing member, a sleeve bearing positioned in said housing for rotatably supporting a shaft, two lubricant feeding openings in said bearing at diametrically opposite points for communicating with the journal surface of said shaft, wicks formed of lubricant absorbent material positioned in said openings for feeding lubricant to two diametrically opposite points on said journal surface, and lubricant absorbent material positioned in said housing surrounding said bearing for retaining lubricant and for feeding the same to said wicks, said journal surface having a spiral groove formed thereon having one extremity disposed across the plane of said openings, said groove extending toward one end of said bearing, said journal surface having another spiral lubricant pumping groove formed thereon opposed to said first-mentioned groove and having one extremity disposed across the plane of said openings, said second groove extending toward the other end of said bearing, said one extremity of one of said grooves being on one side of said journal surface and said one extremity of the other of said grooves being on the other side of said journal surface, said grooves and said two points for feeding lubricant to the journal surface causing said lubricant to flow toward both ends of said bearing regardless of the direction of load on said shaft.

7. In a bearing construction comprising a bearing housing member, a sleeve bearing in said housing for rotatably supporting a shaft, said bearing have two lubricant feeding openings therein at diametrically opposite points and disposed intermediate the ends of said bearing for communicating with the journal surface of said shaft, wicks formed of lubricant absorbent material positioned in said openings for feeding lubricant to two diametrically opposite points on said journal surface, lubricant absorbent material positioned in said housing and surrounding said bearing for retaining lubricant and for feeding the same to said wicks, said journal surface having two peripheral grooves respectively positioned near the ends of said bearing, said journal surface having a spiral groove formed therein with one extremity extending across the plane of said openings and the other end communicating with one of said peripheral groves, said journal surface having another spiral lubricant pumping groove formed thereon opposed to said first-mentioned groove and have one extremity extending across the plane of said openings and the other end communicating with the other of said peripheral grooves, said one extremity of one of said grooves being on one side of said journal surface and said one extremity of the other of said grooves being on the other side of said journal surface whereby both of said extremities are passed under said wicks and one of said extremities is under one of said wicks when the other extremity is under the other of said wicks, said two points for feeding lubricant to the journal surface causing said lubricant to flow toward both ends of said bearing regardless of the direction of load on said shaft.

LAWRENCE W. WIGHTMAN.

REFERENCES CITED

The following references are of record in the file of this patent:

UNITED STATES PATENTS

| Number | Name | Date |
| --- | --- | --- |
| 1,433,424 | Stoner | Oct. 24, 1922 |
| 2,067,034 | Whiteley | Jan. 5, 1937 |
| 2,306,743 | Morrill | Dec. 29, 1942 |